United States Patent
Ozaki et al.

(10) Patent No.: US 7,641,044 B2
(45) Date of Patent: Jan. 5, 2010

(54) CONVEYOR CHAIN FOR TRAVEL WAY

(75) Inventors: Hajime Ozaki, Osaka (JP); Katsutoshi Shibayama, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 75 days.

(21) Appl. No.: 12/024,144

(22) Filed: Feb. 1, 2008

(65) Prior Publication Data

US 2008/0257690 A1   Oct. 23, 2008

(30) Foreign Application Priority Data

Apr. 18, 2007   (JP) .............................. 2007-109777

(51) Int. Cl.
*B65G 17/06* (2006.01)
(52) U.S. Cl. .................. 198/853; 198/688.1; 198/699.1
(58) Field of Classification Search ......... 198/850–853, 198/688.1, 690.2, 699.1
See application file for complete search history.

(56) References Cited

U.S. PATENT DOCUMENTS

| | | | |
|---|---|---|---|
| 2,909,271 A | | 10/1959 | Taylor |
| 5,361,893 A | | 11/1994 | Lapeyre |
| 5,439,097 A | * | 8/1995 | Takahashi et al. ...... 198/867.01 |
| 5,507,383 A | * | 4/1996 | Lapyere et al. ............... 198/853 |
| 5,628,393 A | * | 5/1997 | Steeber et al. ........... 198/699.1 |
| 6,068,112 A | * | 5/2000 | Kasai et al. .................. 198/853 |
| 6,705,460 B2 | * | 3/2004 | Weiser et al. ............... 198/850 |
| 6,948,613 B2 | * | 9/2005 | Guldenfels et al. .......... 198/853 |
| 7,222,730 B2 | * | 5/2007 | Garbagnati et al. ......... 198/853 |
| 2006/0076218 A1 | * | 4/2006 | Marshall et al. ............. 198/853 |

FOREIGN PATENT DOCUMENTS

| | | |
|---|---|---|
| EP | 1 647 515 | 4/2006 |
| JP | 07-172534 | 7/1995 |
| JP | 2006-111449 | 4/2006 |

* cited by examiner

*Primary Examiner*—Mark A Deuble
(74) *Attorney, Agent, or Firm*—Dann, Dorfman, Herrell and Skillman; Henry H. Skillman

(57) ABSTRACT

A conveyor chain for a travel way on which an operator and/or a work carriage are reliably moved in a nonskid manner. The conveyor chain has a series of modules, each with a nonskid material loaded upper surface with front and rear hinge portions for connecting the modules to each other by connecting pins. The nonskid material loaded upper surface has hollows with the hollow surfaces recessed below the upper surface. The upper surface includes a number of supporting ribs project upwardly from the hollow surfaces and terminate flush with the upper surface, so that the transfer of the work carriage is easy and a back bend radius is decreased. Miniaturization and simplification of the conveyor are attained.

5 Claims, 3 Drawing Sheets

CONVEYOR CHAIN FOR TRAVEL WAY

FIELD OF INVENTION

The present invention relates to a conveyor chain for a travel way in which a person or a carriage carrying a workpiece is moved along in an operating area by a conveyor alongside a manufacturing line, an assembly line and the like for articles.

BACKGROUND OF THE INVENTION

In this kind of conveyor chain for the travel way, there has been a conveyor belt formed by a number of plastic chain modules or links having a plurality of ribs. The links are connected to each other by connecting pins as shown, for example, in Japanese Laid-Open Patent Publication No. 2006-111449 (page 1, FIG. 1).

However, since in such a conveyor belt protrusions are protruded upwardly from a transfer surface, when wheels of a work carrier or the like are grounded and rolled on the exposed transfer surface, the traveling vibration and traveling resistance are large. Thus there is a problem that an excessive traveling load is created by the upwardly-projecting protrusions.

Further, when a gap between chain modules in the pitch direction is reduced to provide a transfer surface of high density, a belt inner circumferential side back bend radius cannot be decreased because of a contact interference between adjacent projecting protrusions of the modules. To avoid the interference, an intermediate idler or the like must be appropriately disposed, and there is a problem, in that it is difficult to ensure a suitable belt slack on the belt return run.

SUMMARY OF THE INVENTION

Accordingly, an object of the present invention is to solve the above-described problems or to provide a conveyor chain for a travel way which supports an operator or a work carriage reliably in a nonskid manner, so that the transfer of the workpieces is easy, and the back bend radius is decreased so that miniaturization and simplification of the conveyor are attained.

To attain the above-described object, the invention solves the above-described problems by a novel conveyor chain for a travel way in which a number of synthetic resin chain links having nonskid material loaded surfaces are connected to each other by connecting pins. The novel links are characterized in that the upper surface which is loaded with nonskid material is formed with a number of objective supporting ribs which project from hollows in the upper nonskid material loaded surface in a protruding manner so as to terminate flush with the upper nonskid material surface.

Preferably the cross-sectional shapes of said objective supporting ribs are formed as saw teeth.

Further, in addition, at least some of the objective supporting ribs comprise straight segments arranged in a polygonal pattern consisting of a combination of hexagon shapes and rhombus shapes.

Thus, when using a conveyor or travel way of the present invention in an operating area along a manufacturing line, an assembly line and the like for work pieces, the following peculiar effects are obtained.

Since the upper nonskid material loaded surface of the chain links is formed with a number of objective supporting ribs which project from hollows provided in the upper nonskid surfaces in a protruding manner, the rubber bottoms of safety shoes worn by an operator, or the wheels of a work carriage and the like, are pushed into a number of objective ribs formed at positions where the rubber bottoms are grounded and the ribs are deformed. Thus a reliable nonskid function for the operators and work carriages can be realized. Further, since a number of objective supporting ribs are provided from a nonskid surface-carved base surface in a projecting manner so as to be flush with the upper nonskid material loaded surface, traveling vibration and traveling resistance, which are liable to occur when wheels of the work carriage are grounded and rolled, are significantly suppressed. Thus smooth movement of the work carriage can be easily attained.

And since the nonskid material loaded surface of the chain module is formed with a number of objective supporting ribs, which project from hollows in the upper nonskid loading surface in a protruding manner, contact between the objective supporting ribs in the chain modules can be avoided when a transfer surface is designed in which a number of chain modules are formed in a high density by reducing the mutual gaps of the chain modules in the pitch direction. Thus the back bend radius is decreased so that miniaturization and simplification of the conveyor can be attained.

Further, since a cross-sectional shapes of the objective supporting ribs are formed to be saw teeth, the rubber bottoms of safety shoes worn by an operator, or the wheels of the work carriage are pushed onto a number of objective ribs and cause them to be deformed at positions where the rubber bottoms are grounded. Thus a reliable nonskid function for the operators and work carriages can be further realized.

Further, since the straight segments of the projecting ribs are in a polygonal pattern consisting of a number of hexagon shapes and rhombus shapes, even if the operator and/or the work carriage are moved in any direction, a reliable nonskid function for the operator and work carriage can be realized.

If in a conveyor chain for a travel way, in which a number of nonskid material loaded surface mounted synthetic resin chain modules or links are adapted to be connected to each other by connecting pins, the nonskid material loaded surface of the chain module is formed with a number of objective supporting ribs which project from the bases of hollows provided in an upper nonskid material loaded surface sop as to be flush with the upper nonskid surface, and an operator and a work carriage are reliably allowed to be moved in a nonskid manner so that a transfer of a work carriage is easy and if the backbend radius is decreased whereby miniaturization and simplification of the conveyor are attained.

The synthetic resin material of the chain module used in the present invention can be molded, and can assume strong toughness and shape retention enough to support the operator and work carriage. Any such material having these properties may be used, for example, engineering plastic resins such as polyethylene resin, polypropylene resin, acetal resin and the like, and reinforced resins may be used in which reinforcing fibers such as glass fibers or the like are contained.

Further, if the shapes of the chain modules used in the present invention are those which are formed such that a number of objective supporting ribs are formed to be flush with the upper nonskid material loaded surface while the ribs have hollowed-out nonskid loading surfaces, any shapes may be used. Additionally concretely speaking, the shape of the chain module is of course one in which a number of hinge portions for inserting connecting pins and connecting them to each other interdigitatedly are formed at front and rear edges in the connection longitudinal direction as disclosed in the above-noted Japanese laid-open patent publication No. 2006-111449.

It is noted that the "hollowed-out" surface referred to in the present invention means a surface where there is a hollow around the base of the ribs which is recessed toward the inside of a chain module so that the shaped portion is relatively formed in a protruding manner. The shaped portion can be formed by any means such as machining, molding or the like.

Further, with a form of a number of arranged objective supporting ribs adopted in the present invention, if the form is a combination pattern consisting of hexagonal shapes and a rhombus shapes for realizing a reliable nonskid state of an operator and a work carriage even if the operator and the work carriage are moved in any direction, any concrete combination patterns may be used.

BRIEF DESCRIPTION OF THE DRAWINGS

A conveyor chain for a travel way, which is an example according to the present invention, will be described in detail with reference to drawings in which.

DESCRIPTION OF A PREFERRED EMBODIMENT

Figure 3:
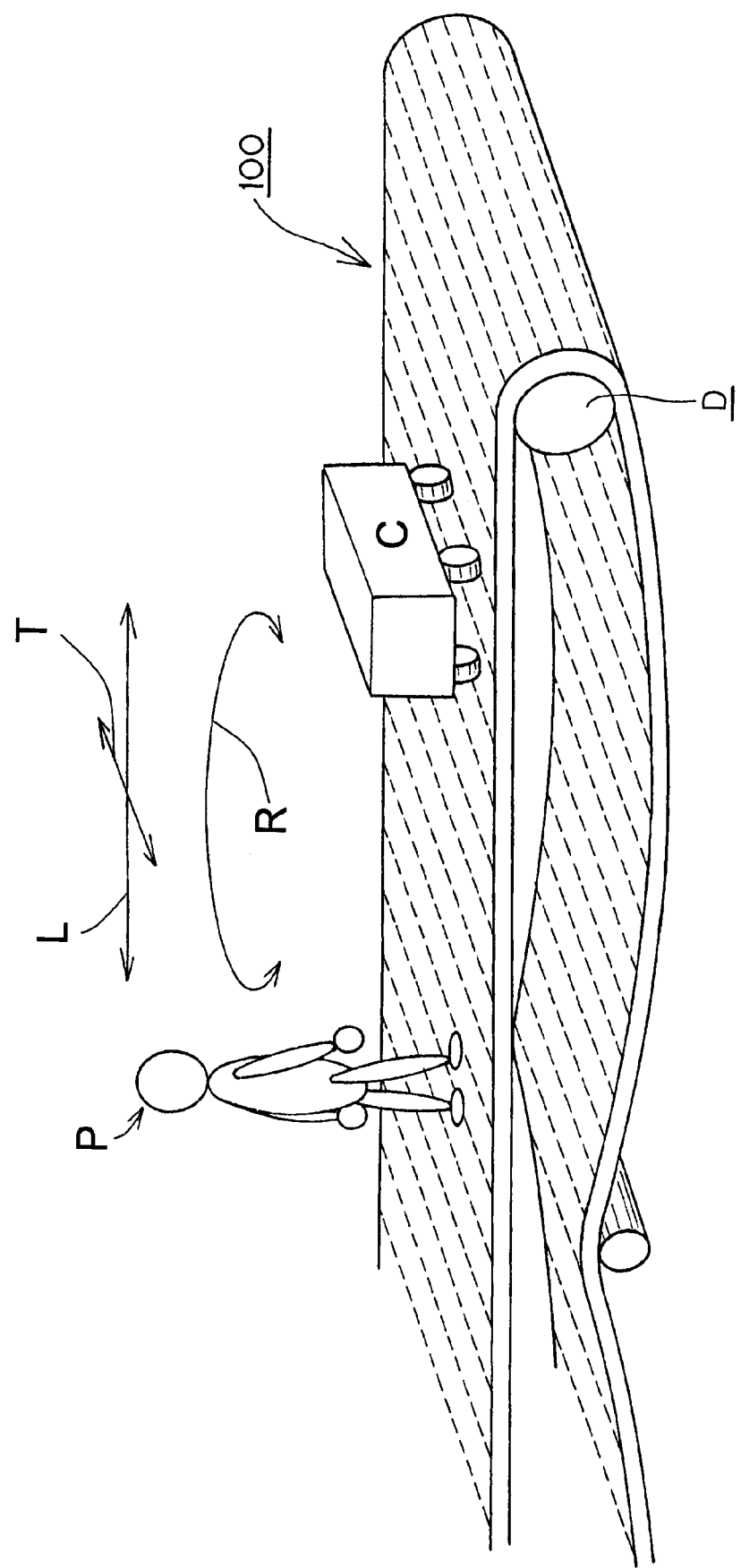
FIG. 3 is a fragmentary diagram of a travel way embodying a conveyor chain with the modules or links of FIG. 1.

As shown in FIG. 3, a conveyor chain 100 for a travel way according to an example of the present invention is used for moving a person P, a working carriage C, or the like extends in a longitudinal direction L in a working area alongside a manufacturing line (not shown). The chain 100 is composed of a number of polyethylene resin chain modules 110 (FIG. 1) adapted to be connected to each other by connecting pins (not shown) which extend in a transverse direction T. The conveyor chain 100 is driven in a traveling manner along manufacturing lines through transverse driving shafts D.

Figure 1:
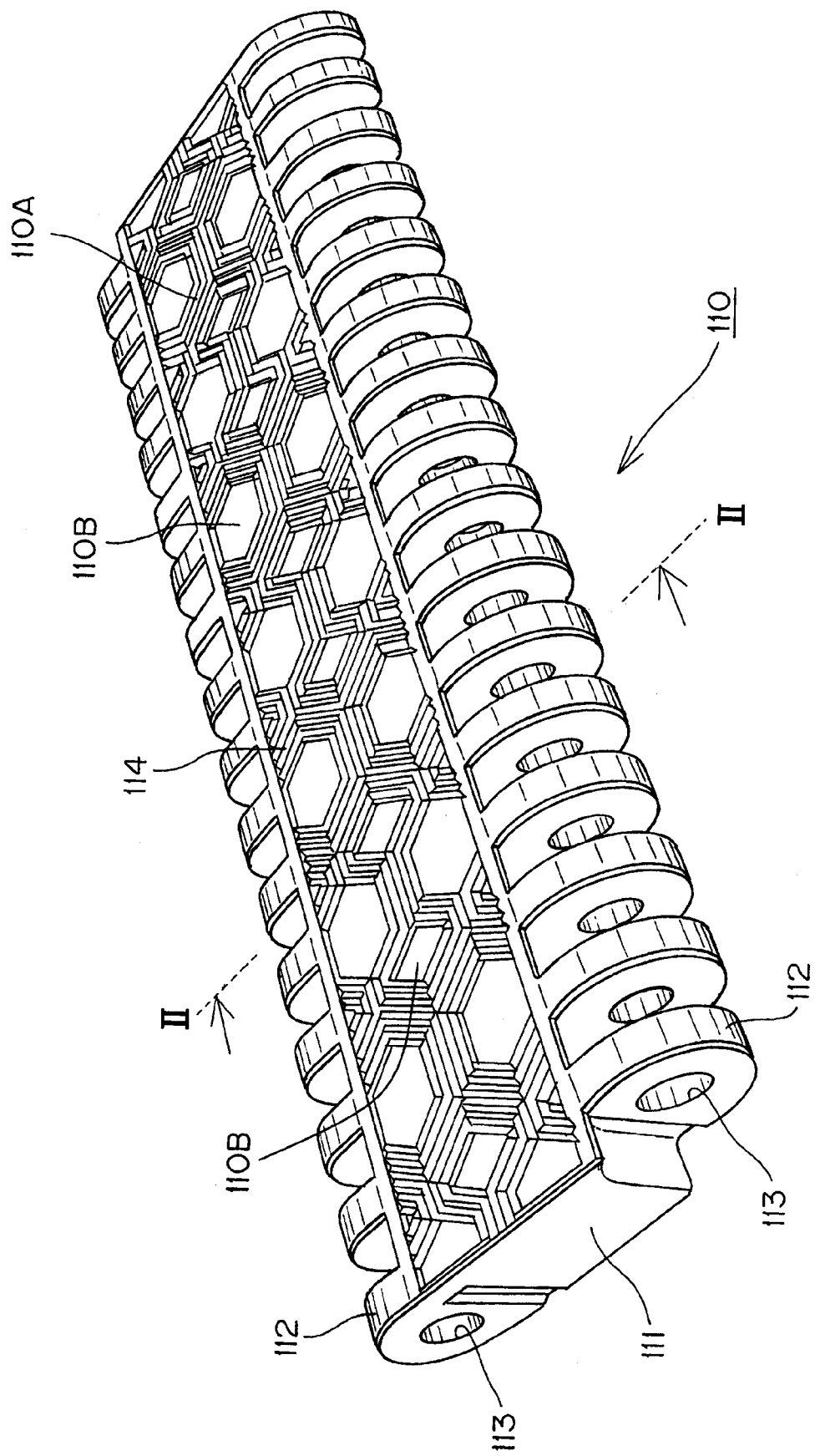
FIG. 1 is a perspective view of a chain module or link used in the conveyor chain for a travel way, which is an embodiment of the present invention.

It is noted that the reference numeral 111 shown in FIG. 1 denotes a module body portion where the upper nonskid material loaded surfaces 110A are hollowed-out to form hollows 110B in the upper surface of the chain module 110. The reference numerals 112 denote a number of hinge portions formed in front and rear edges of the chain module 110 in the longitudinal direction for receiving the above-mentioned connecting pins thereinto to connect the links to each other interdigitatedly, and the reference numeral 113 denotes hinge holes for inserting the connecting pins. It should be noted that the hinge portions 112 have semi-circular outlines, and the upper surface 110A is tangential to and extends between the semi-circular outlines of the front and rear hinge portions, and has a border portion along the entire periphery of the module.

The nonskid material loaded upper surface 110A of the chain module 110, which is the most characteristic in the conveyor chain 100 for a travel way of the present example will be described in more detail with reference to FIGS. 1, 2 and 2A.

The nonskid material loaded upper surface 110A of this chain module 110 is formed with a number of objective supporting ribs 114 which project upwardly from the nonskid recessed surfaces of the hollows 110B, so as to be flush with the upper surface of the module. The objective supporting ribs 114 are formed as saw teeth shapes as seen in FIG. 2A in an enlarged scale.

It is noted that the step difference between the nonskid material loaded upper surface 110A and the recessed surface 110B in the chain module 110 used in the present example is set to about 1.0 mm.

The objective supporting ribs 114 forming a nonskid material loaded upper surface 110A of the chain module 110 comprise straight segments arranged in polygonal patterns combining of a number of hexagon shapes and rhombus shapes. Here, in the case of the present example, a number of hexagon shapes and rhombus shapes forming the nonskid loading surface 110A with a number of objective supporting ribs 114 form polygons having sizes narrower than the wheel width of the work carriage, for example 30.0 mm, so that a drop off of an outer circumferential portion of the work carriage is avoided.

In the conveyor chain 100 for a travel way, the nonskid material loaded surface 110A of this chain module 110 is formed of a number of objective supporting ribs 114 which are provided from a nonskid recessed surface 110B in a protruding manner. The rubber bottoms of safety shoes worn by an operator, and the wheels of a work carriage or the like, deform a number of objective ribs 114 formed at positions where the rubber bottoms are grounded. Thus reliable nonskidding support of the operators and work carriages can be realized. Further, since a number of objective supporting ribs 114 project from a nonskid recessed surface in a protruding manner so as to terminate flush with the nonskid upper surface 110A, traveling vibration and traveling resistance, which are liable to occur when wheels of the work carriage are grounded and rolled, are significantly suppressed. Thus the movement of the work carriage on the travel way can be easily attained.

The nonskid material loaded upper surface 110A of the chain module 110 is formed by a number of objective supporting ribs 114, which are provided from a nonskid loading recessed surface 110B in a protruding manner, contact between the objective supporting ribs 114 in the chain modules 110 can be avoided when a transfer surface is designed in which a number of chain modules 110 are formed in a high density by reducing the mutual gaps of the chain modules in the pitch direction. Thus the back bend radius is decreased so that miniaturization and simplification of the conveyor can be attained.

Figures 2, 2A:
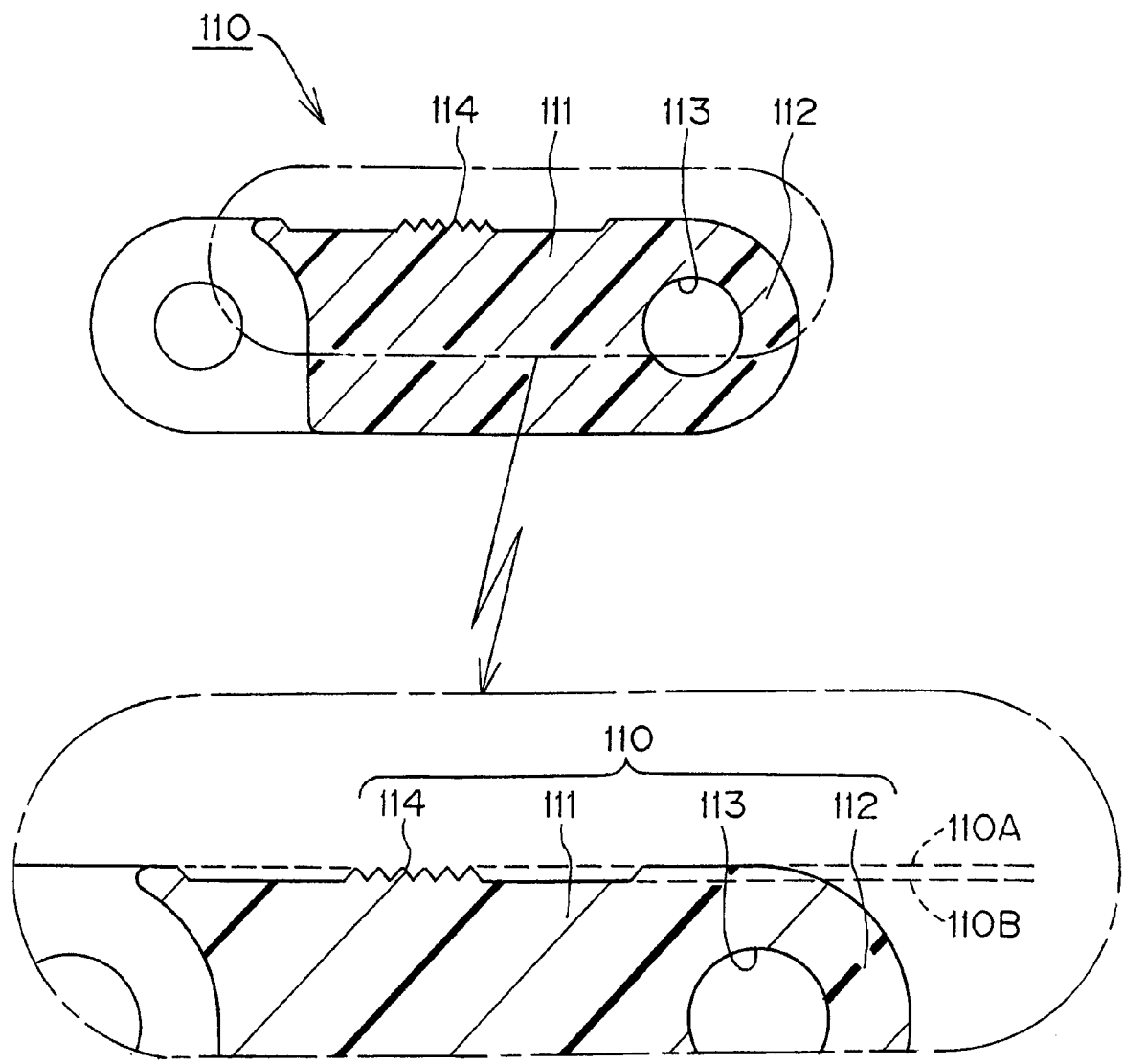
FIG. 2 is a cross-sectional view taken from the line II-II in FIG. 1.
FIG. 2A is a fragmentary enlargement of the portion of FIG. 2 which is circled.

Further, since a cross-sectional shape of the objective supporting ribs 114 is formed to be saw teeth as shown FIG. 2A, the rubber bottoms of safety shoes worn by an operator P, or the wheels of a work carriage C and the like, deform a number of objective ribs 114 formed at positions where the rubber bottoms are grounded and have an increased contact degree. Thus a reliable nonskid function for the operators and work carriages can be further realized.

Further, since a number of objective supporting ribs forming a nonskid material loaded surface 110A of the chain module 110 are straight segments arranged so as to assume a combination polygonal pattern consisting of a number of hexagon shapes and rhombus shapes, even if the operator and work carriage are moved in any direction, longitudinal L, transverse T or rotary R, as shown in FIG. 3, a reliable nonskid function for the operator and work carriage can be realized.

Therefore, in the thus obtained conveyor chain 100, which is an example of the present invention, the nonskid material loaded surface 110A of the chain module 110 is formed of a number of objective supporting ribs 114 which are provided from a nonskid material loaded recessed hollow surface 110B in a protruding manner so as to terminate flush with the nonskid material loaded surface 110A, a reliable nonskid function for the operator and the work carriage is realized and a transfer of the work carriage becomes easy and a back bend radius is decreased so that miniaturization and simplification of the conveyor can be realized. Thus the beneficial effects of the present invention are very large.

The invention claimed is:

1. A conveyor chain for a travel way in which a number of nonskid material loaded surface mounted synthetic resin chain modules are adapted to be connected to each other by connecting pins, characterized in that said nonskid material loaded surface of the chain module is formed of a number of supporting ribs which project from a nonskid material loaded recessed hollow surface in a protruding manner so as to be flush with the nonskid material loaded upper surface selected ones of said supporting ribs of said chain module being straight segments arranged in polygonal Patterns in a combination of a number of hexagon shapes and rhombus shapes.

2. A conveyor chain for a travel way according to claim 1, characterized in that at least some of said supporting ribs have a cross-sectional shape of saw tooth form.

3. A conveyor chain for a travel way adapted to move in a longitudinal direction alongside a manufacturing line comprising a plurality of nonskid material loaded surface synthetic resin chain modules extending transversely of said travel way and adapted to be connected to each other by transverse connecting pins, said modules having a nonskid material loaded upper surface, with hollows having recessed surfaces, said upper surface comprising a plurality of supporting ribs which project upwardly from said recessed hollow surfaces in a protruding manner so as to terminate flush with the nonskid material loaded upper surface selected ones of said supporting ribs of said chain module being straight segments arranged in polygonal patterns in a combination of a number of hexagon shapes and rhombus shapes.

4. A conveyor chain according to claim 3 wherein each rib has a saw-tooth cross section.

5. A conveyor chain according to claim 3 wherein each said module has hinge portions projecting longitudinally from the front and rear edges, said hinge portions having semi-circular outlines, said upper surface being tangential to said outlines.

* * * * *